United States Patent [19]
English

[11] Patent Number: 5,375,788
[45] Date of Patent: Dec. 27, 1994

[54] FISHING REEL REFILL TOOL

[76] Inventor: John P. English, 21,418 Carol Sue La., Santa Clara, Calif. 91350

[21] Appl. No.: 44,729

[22] Filed: Apr. 12, 1993

[51] Int. Cl.⁵ .................. B65H 49/00; A01K 97/16
[52] U.S. Cl. ........................... 242/129.8; 43/25; 242/597.8; 242/902
[58] Field of Search ............. 242/129.8, 106, 96, 242/99, 47, 129.5, 129.7; 43/25

[56] References Cited

U.S. PATENT DOCUMENTS

| | | | |
|---|---|---|---|
| 3,026,059 | 3/1962 | Dennler | 242/106 |
| 3,679,151 | 7/1972 | Rice | 242/129.7 X |
| 3,685,761 | 8/1972 | Zelinski | 242/129.7 |
| 3,951,354 | 4/1976 | Bagby | 242/129.8 |
| 4,739,946 | 4/1988 | English | 242/129.8 |
| 5,029,409 | 7/1991 | Nouwens | 242/129.8 X |

*Primary Examiner*—Stanley N. Gilreath
*Attorney, Agent, or Firm*—Gene W. Arant

[57] ABSTRACT

A fishing line reel refill tool includes a collapsible frame adapted to be secured upon a fishing pole and a shaft for holding a fishing line refill spool. The shaft has an enlarged end and a threaded end, and the frame has aligned openings, one of which is threaded for securing the shaft thereto while also frictionally restraining the refill spool against rotation. The frame provides an internal recess for storing the shaft within the frame when the tool is not in use.

10 Claims, 3 Drawing Sheets

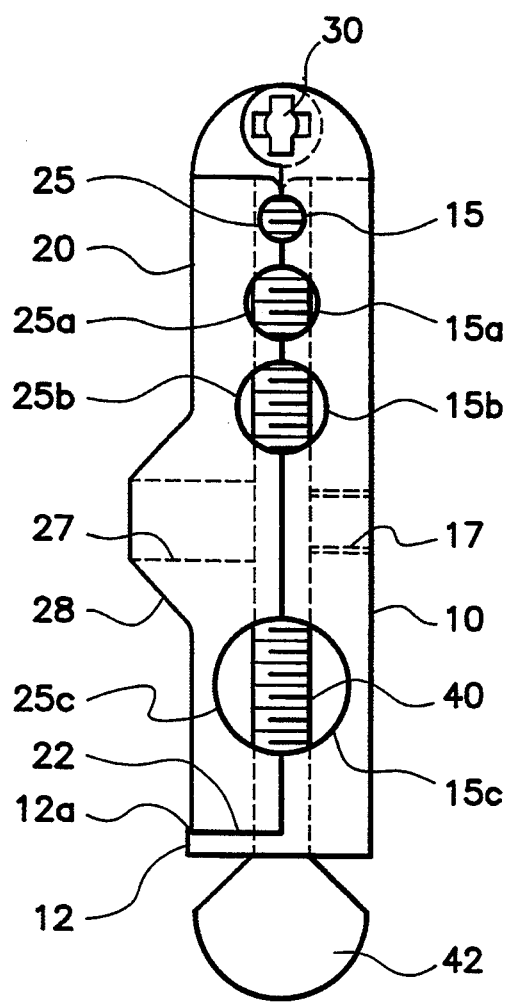
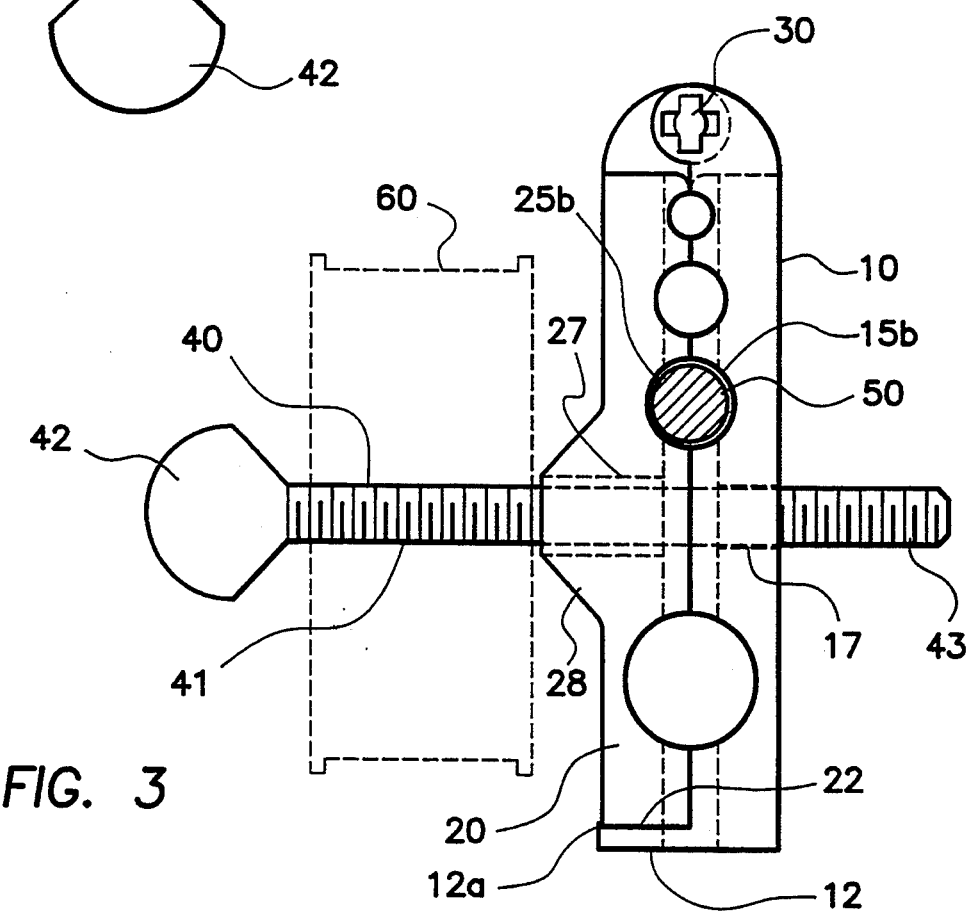

(1)

FISHING REEL REFILL TOOL

RELATED PATENT

The invention disclosed and claimed in this application is an improvement over that which is shown in my U.S. Pat. No. 4,739,946 issued Apr. 26, 1988.

BACKGROUND OF THE INVENTION

It is important to a fisherman, when his fishing line has been lost or broken, to have a quick and easy way to refill his reel with a new line. Spools of refill line have long been available, but using them at the time of need was notoriously inconvenient until the introduction of my invention as shown in the above-identified patent. With that product, now sold under the trademark MY ADD-A-LINE, it is a quick and easy job to refill the reel.

I have now simplified the product, making it with fewer parts, easier to use, easier to manufacture, and more compact and hence easier to store when not in use.

SUMMARY OF THE INVENTION

The present invention provides an improved fishing reel refill tool which is compact and easy to use. More specifically, a shaft which supports the refill spool may, when not in use, be safely and conveniently stored inside the frame of the tool. This guards against possible loss or misplacement of this part of the tool.

DRAWING SUMMARY

FIG. 1 is a side view of the tool in its closed or storage position;

FIG. 3 shows both the frame and the shaft in their operative positions of use;

DETAILED DESCRIPTION

Figure 2:
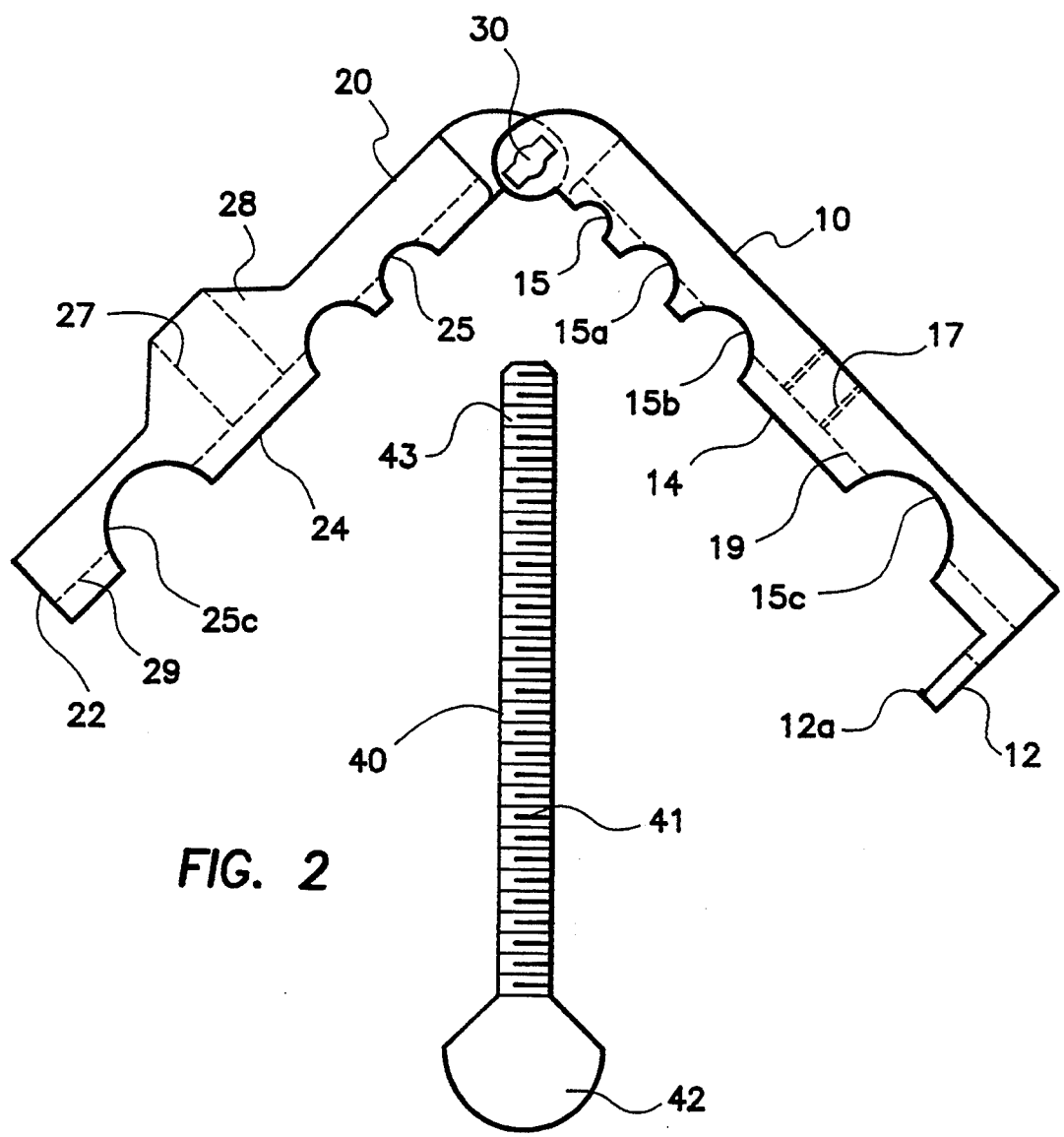
FIG. 2 shows the frame opened up and the shaft removed for use.

Referring now the drawings, my improved tool consists of only four parts, which are preferably made from a low-density plastic material so that if the tool is inadvertently dropped into the water it may be easily recovered. The parts of the tool include a first frame member 10, a second frame member 20, a pivot mechanism 30, and a shaft 40.

The frame members 10 and 20 are elongated and together provide a support frame adapted to be retentively mountws upon a fishing pole. The members 10 and 20 are pivotally secured at one of their ends by a hinge or pivot mechanism 30, so that they may be pivoted into a closed parallel relationship with mutually facing inner longitudinal edges 14 and 24, respectively. Alternatively, they may also be pivotally moved into an open relationship with their inner longitudinal edges angled apart. The frames 10, 20, also have associated pairs of depressions 15, 25; 15a, 25a; 15b, 25b; etc., which cooperatively form openings transverse to the direction of the pivoting movement. The openings thus formed are of several different sizes so as to permit retentively mounting the frame upon a fishing pole of any selected diameter.

Frame member 10 at its other end has a latch finger 12 extending perpendicular to the longitudinal axis of the member, and the latch finger 12 has a short lip 12a inturned on its outer end. In the closed position of the frame as shown in FIG. 1, the latch finger 12 of frame member 10 closes upon and retentively captures the flat outer end 22 of frame member 20.

Frame members 10, 20, also have aligned openings 17, 27, near the longitudinal centers of said members, which openings extend in the direction of the pivoting movement of said frame members. Thus the pair of aligned openings 17, 27 extend in a direction which is generally perpendicular to the openings formed by the pairs of depressions 15, 25.

The shaft 40 is elongated and is removably insertable into aligned openings 17, 27 for supporting the refill spool. Shaft 40 has an elongated body 41 of substantially uniform diameter whose outer end is enlarged at 42, and whose inner end is threaded at 43. Aligned opening 17 in first frame member 10 is also threaded for securely receiving the threaded end 43 of shaft 40.

The opening 27 in frame member 20 is not threaded, and is preferably of slightly greater diamter than the body 41 of shaft 40 so as to permit easy insertion of the shaft therein. The frame member 20 is enlarged at 28 on its outer longitudinal surface about the opening 27 so as to provide enhanced support for shaft 40 when inserted therein.

OPERATION

Figure 5:
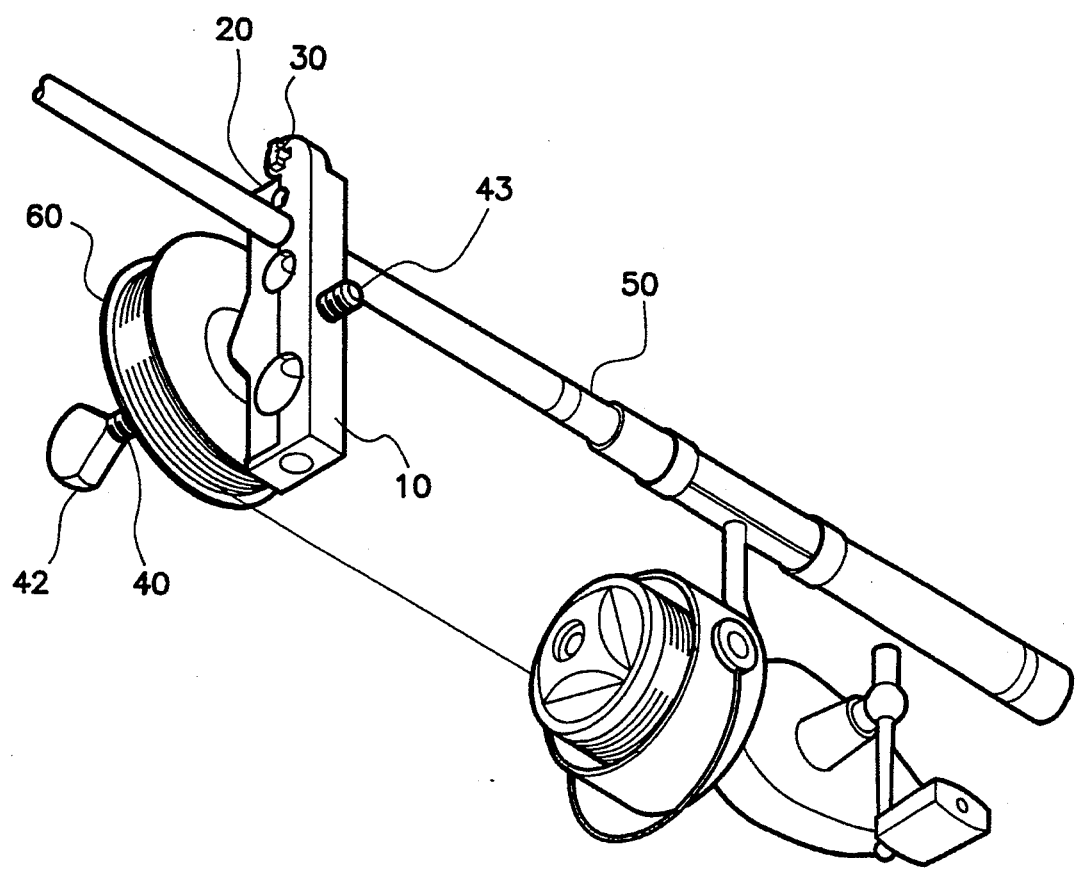
FIG. 5 is an isometric view of the invention when in use.

In operation, the frame members 10, 20, are placed about the fishing pole 50, and are then closed together and clamped by the clamping structure 12, 12a, and 22. The refill spool 60, shown only in FIGS. 3 and 5, is placed over the body 41 of shaft 40. Threaded inner end 42 of the shaft is then inserted through the opening 27 in frame member 20 and then into the threaded opening 17 of frame member 10. While FIG. 3 shows the fishing pole 50 only loosely received within the transverse opening 15b, 25b, it will be understood that in general the diameter of the pole at the location on its length where it is grasped will be somewhat greater than the diameter of the associated transverse opening, thus causing a certain amount of flexing or bending of the frame. Shaft 40 is then rotated to tighten the threaded connection by pushing spool 60 against frame member 20 and at the same time to more firmly secure the frame upon the fishing pole. This action of tightening shaft 40 also serves to create friction against the refill spool, thereby restraining its free rotation. The tightness is then adjusted to create exactly the desired amount of tension in the fishing line as it is being pulled off the refill spool by driven rotation of the reel.

STORAGE

Figure 4:
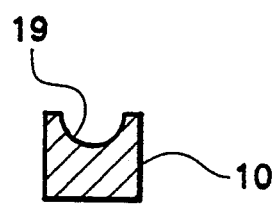
FIG. 4 is an end view of one frame member.

Frame member 10 also has a series of recesses 19 formed therein between adjacent depressions 15. In similar fashion, frame member 20 has a series of recesses 29 formed therein between adjacent depressions 25. Recesses 19 and 29 together provide a longitudinal opening between the frame members 10, 20, for storage of shaft 40 when it is not in use. Please see FIG. 4 which shows an end view of frame member 10 from its outer end 12. This storage position is shown in FIG. 1.

A particular feature of the invention is that the latch means 12, 12a, 22, is adapted to resist release of the frame members 10, 20, before the said shaft 40 is removed therefrom. This is achieved by controlling the dimensions of the parts. The presence of shaft 40 occupying the longitudinal recesses 14, 24, restricts the bending or flexing of the frame members 10, 20, just enough that it is difficult to release the latch. However, when the shaft 40 is removed, additional flexing of the frame members can occur, thus making the latch easy to open.

What I claim as my invention is:

1. An improved fishing reel refill tool for supporting a refill spool directly from the fishing pole while a refill line is wound from that spool onto the reel, said improved tool comprising:

a support frame including first and second elongated members pivotal from one of their ends into a closed parallel relationship with mutually facing inner longitudinal edges that have associated depressions which cooperatively form an opening transverse to the pivoting movement for retentively mounting said frame upon a fishing pole;

said members also having a pair of aligned openings which extend in the direction of the pivoting movement of said frame members;

an elongated shaft removably insertable into said aligned openings for supporting the refill spool, said shaft having an enlarged end and a threaded end, the aligned opening in said first frame member being threaded for securely receiving said threaded end of said shaft; and said frame members also having longitudinal recesses on their mutually facing edges which allow said shaft, when not in use, to be inserted in parallel between said members for storage purposes.

2. An improved refill tool as claimed in claim 1 wherein said aligned opening in said second member is adapted to permit easy insertion of said shaft, and said second member is enlarged on its outer longitudinal surface about said aligned opening thereof to provide enhanced support for said shaft when inserted therein.

3. An improved refill tool as claimed in claim 1 which further includes latch means for releasably securing the other ends of said first and second frame members together in said parallel relationship when said shaft is stored therebetween.

4. An improved refill tool as claimed in claim 1 wherein said aligned openings are near the longitudinal centers of said members.

5. An improved refill tool as claimed in claim 1 wherein said frame members have associated pairs of depressions which cooperatively form openings extending substantially transverse to the pivoting movement, said openings being of different sizes to permit retentively mounting said frame upon a fishing pole of any selected diameter.

6. An improved tool for use when the reel of a fishing pole needs to be refilled, by supporting a refill spool directly from the fishing pole while a refill line is wound from that spool onto the reel, said improved tool comprising:

a support frame including first and second elongated members secured by pivot means at one of their ends so that they may selectively be pivoted either into a closed and parallel relationship with mutually facing longitudinal edges, or into an open relationship with said longitudinal edges angled apart;

said frame members on their mutually facing longitudinal edges having a series of depressions such that in the closed position of said members associated pairs of said depressions cooperatively form openings extending substantially transverse to the direction of the pivoting movement of said members, said openings being of different sizes so that said frame may be retentively mounted upon a fishing pole of any selected diameter;

said members also having a pair of aligned openings which lie substantially in the plane of the pivoting movement of said frame members;

an elongated shaft removably insertable into said aligned openings for supporting the refill spool, said shaft having an enlarged end and a threaded end, one of said aligned openings being threaded for receiving said threaded end; and said frame members also having recesses on their mutually facing edges which allow said shaft when not in use to be inserted between said members in a parallel relation for storage purposes.

7. An improved refill tool as claimed in claim 6 which further includes latch means for releasably securing the other ends of said first and second frame members together in said closed and parallel relationship when said shaft is stored therebetween.

8. An improved refill tool as claimed in claim 7 wherein said latch means is adapted to resist release of said frame members before said shaft is removed.

9. An improved refill tool as claimed in claim 6 wherein said aligned openings are near the longitudinal centers of said members.

10. An improved refill tool as claimed in claim 6 wherein said frame members have associated pairs of depressions cooperatively forming openings extending substantially transverse to the pivoting movement, said openings being of different sizes to permit retentively mounting said frame upon a fishing pole of any selected diameter.

* * * * *